(12) United States Patent
Hirose et al.

(10) Patent No.: US 11,370,131 B2
(45) Date of Patent: Jun. 28, 2022

(54) ABNORMALITY DETECTING DEVICE AND ABNORMALITY DETECTING METHOD

(71) Applicant: Nissan Motor Co., Ltd., Kanagawa (JP)

(72) Inventors: Satoru Hirose, Kanagawa (JP); Toru Takagi, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 16/976,225

(22) PCT Filed: Feb. 28, 2018

(86) PCT No.: PCT/JP2018/007514
§ 371 (c)(1),
(2) Date: Aug. 27, 2020

(87) PCT Pub. No.: WO2019/167171
PCT Pub. Date: Sep. 6, 2019

(65) Prior Publication Data
US 2021/0031384 A1    Feb. 4, 2021

(51) Int. Cl.
*B25J 19/00* (2006.01)
*G01M 1/22* (2006.01)

(52) U.S. Cl.
CPC .......... *B25J 19/0066* (2013.01); *G01M 1/22* (2013.01)

(58) Field of Classification Search
CPC .................. B25J 19/0066; G01M 1/22; G05B 2219/37351
See application file for complete search history.

(56) References Cited

U.S. PATENT DOCUMENTS

| 2015/0134111 A1 | 5/2015 | Nakajima |
| 2015/0277443 A1 | 10/2015 | Beltran et al. |
| 2019/0101103 A1* | 4/2019 | Haseba ................. F03D 80/70 |

FOREIGN PATENT DOCUMENTS

| JP | H06320457 A | 11/1994 |
| JP | 2013000833 A | 1/2013 |
| JP | 2013144325 A | 7/2013 |
| JP | 2015116663 A | 6/2015 |

* cited by examiner

*Primary Examiner* — Manuel A Rivera Vargas
(74) *Attorney, Agent, or Firm* — Osha Bergman Watanabe & Burton LLP

(57) ABSTRACT

An abnormality detecting device determines an abnormality in an apparatus by comparing data on vibration detected in the apparatus with a predetermined threshold. Moreover, the abnormality detecting device changes the threshold depending on a length of work time required for the apparatus to perform a certain work.

15 Claims, 11 Drawing Sheets

| WORK TYPE | C1 | C2 | C3 |
|---|---|---|---|
| NORMAL MODEL | P1(TH1) | P2(TH2) | P3(TH3) |

ABNORMALITY DETECTING DEVICE AND ABNORMALITY DETECTING METHOD

TECHNICAL FIELD

The present invention relates to an abnormality detecting device and an abnormality detecting method.

BACKGROUND ART

Conventionally, there has been disclosed a technique in which detection information of a vibration sensor is processed to determine whether a robot is in a dangerous condition or not.

CITATION LIST

Patent Literature

Patent Literature 1: Japanese Patent Application Publication No. H06-320457

SUMMARY OF INVENTION

Technical Problem

In some cases, a normally operating apparatus such as a robot presents an abnormality as a sign of future failure. Time to failure varies even between apparatuses in which the same level of abnormality is occurring, depending on work speed at which the apparatus performs work. When the work speed is high, the time to failure is short.

Thus, when the work speed is high, it is necessary to detect a small abnormality and predict failure of the apparatus at an early stage. Specifically, when the work time required for the apparatus to perform a certain work is short (work speed is high), the failure of the apparatus needs to be predicted at an early stage. Meanwhile, when the work time is long (work speed is low), the time to failure is long. Accordingly, for example, if the failure is predicted at an early stage by the method similar to the case where the work time is short, there is a problem that the abnormality in the apparatus is detected too early.

The present invention has been made in view of the aforementioned problems and an object is to provide an abnormality detecting device and an abnormality detecting method that can detect an abnormality in an apparatus by using a criterion for determination depending on the length of work time in which the apparatus performs a certain work.

Solution to Problem

An abnormality detecting device according to one aspect of the present invention determines an abnormality in an apparatus by comparing data on vibration detected in the apparatus with a predetermined threshold and changes the threshold depending on a length of work time required for the apparatus to perform a certain work.

Advantageous Effects of Invention

The present invention can detect an abnormality in an apparatus by using a criterion for determination depending on the length of work time in which the apparatus performs a certain work.

DESCRIPTION OF EMBODIMENTS

Figure 1:
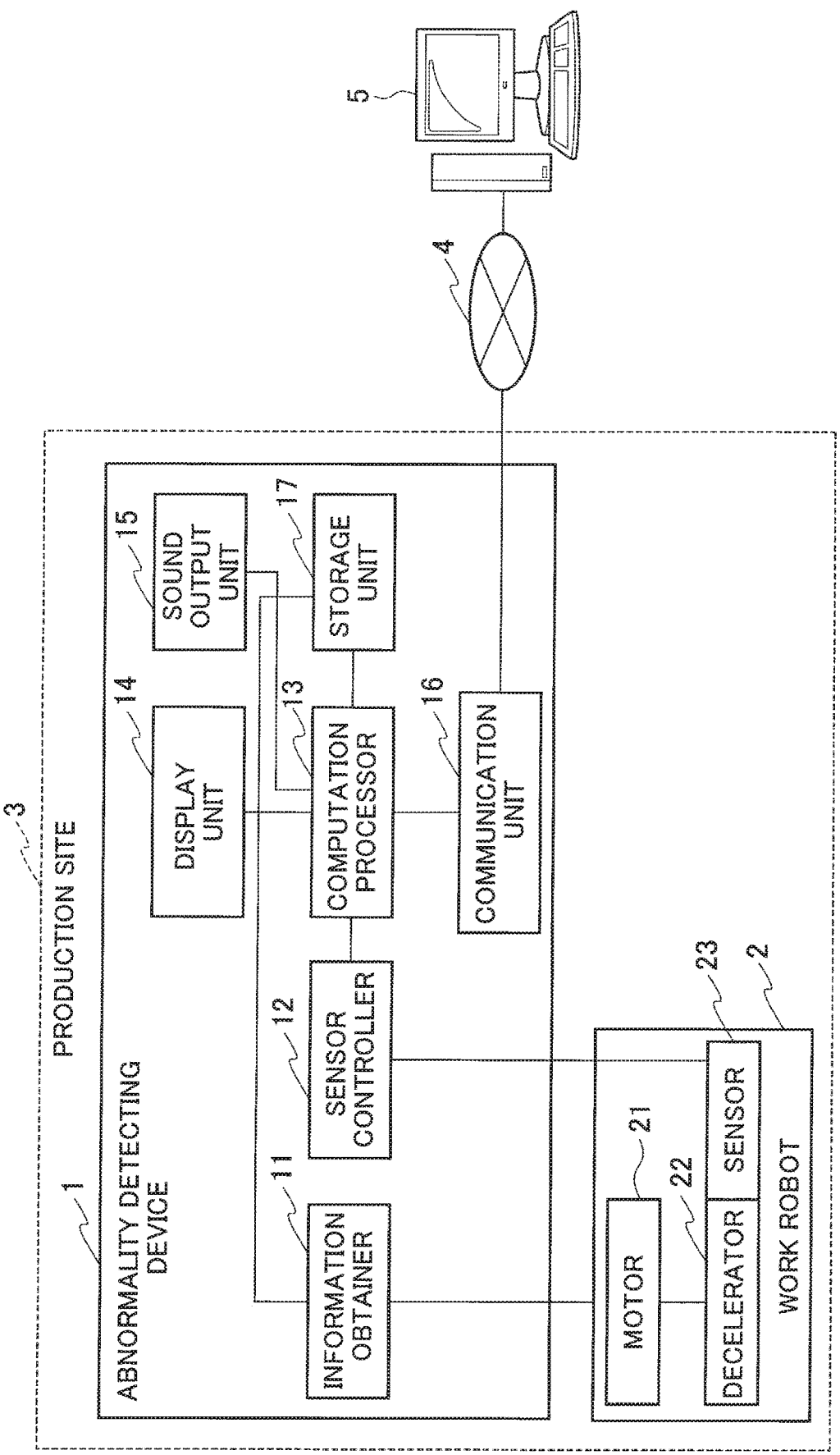
FIG. 1 is a diagram illustrating a configuration of a system including an abnormality detecting device of a first embodiment.

Embodiments are described with reference to the drawings. In the illustration of the drawings, the same parts are denoted by the same reference numerals and description thereof is omitted.

In the following embodiment, description is given of a technique of detecting an abnormality in an apparatus such as a work robot (welding robot or the like) that is, for example, a multi-axis machine for assembly of an automobile.

Both or one of the following methods (1) and (2) is performed to increase work speed in a production line using the apparatus such as the work robot. The method (1) is a method of reducing the length of work time (hereafter, referred to as work time length) required to perform a predetermined work. The method (2) is a method of reducing the length of pause time (hereafter, referred to as pause time length) of pausing between one work and the next work, that is the length of pause time in which the apparatus pauses before the work. For example, when the work robot is a welding robot, the work time length is, for example, about 50 seconds and the pause time length is about 5 to 10 seconds. The pause time includes time for switching parts to be welded and the like.

In some cases, although the apparatus can execute the work, an abnormality occurs as a sign of future failure. The level of the abnormality rises over time and the abnormality eventually leads to failure in some cases. The time to failure varies even between apparatuses in which the same level of abnormality is occurring, depending on work speed. The higher the work speed is, the shorter the time to failure is.

Accordingly, in the embodiment, when the work speed is high, a small abnormality is detected to predict the failure of the apparatus at an early stage. Specifically, when the work time length is short or the pause time length is short, a small abnormality is detected to predict the failure of the apparatus at an early stage. Note that the failure of the apparatus is not limited to the case where the apparatus cannot exhibit its functions and a state where the possibility of the apparatus failing becomes very high or a state where the frequency of occurrence of the abnormality becomes very high may be defined as the failure.

First Embodiment

FIG. 1 is a diagram illustrating a configuration of a system including an abnormality detecting device of a first embodiment.

The abnormality detecting device 1 is a device configured to detect an abnormality in an apparatus and detects an abnormality with the apparatus being, for example, a work robot 2 that is a multi-axis machine for assembly of an automobile or the like. Specifically, the abnormality detecting device 1 predicts failure. The abnormality detecting device 1 and the work robot 2 are provided in a production site 3 and the abnormality detecting device 1 is connected to a computer 5 via a communication line 4.

The work robot 2 is an apparatus including a rotation mechanism (for example, motor, hereafter referred to as motor 21) of the work robot 2 and a mechanism (for example, decelerator, hereafter referred to as decelerator 22) for converting the torque of the motor 21 to a higher torque to move a large load with an arm or the like of the work robot 2. The decelerator 22 can also be referred to as the rotation mechanism like the motor 21. The work robot 2 repeatedly performs a predetermined work A.

A sensor 23 configured to detect an acceleration of a portion near the decelerator 22 is arranged in the portion near the decelerator 22 as, for example, a vibration sensor configured to detect vibration of this portion. The sensor 23 generates a waveform indicating the acceleration of the portion where the sensor 23 is arranged and samples this waveform at a predetermined sampling cycle to output an acceleration signal M1. Note that the configuration may be such that three sensors 23 are arranged to output the acceleration signal M1 for each of accelerations in three directions orthogonal to one another. Moreover, the sensor 23 is not limited to a sensor configured to detect the acceleration and a sensor capable of detecting the magnitude of the vibration by detecting speed or movement of the arranged portion may be used. For example, various sensors that can obtain changes in orientations in time series such as a piezoelectric sensor, an angular speed sensor, and a gyroscope sensor can be used.

Figure 2:
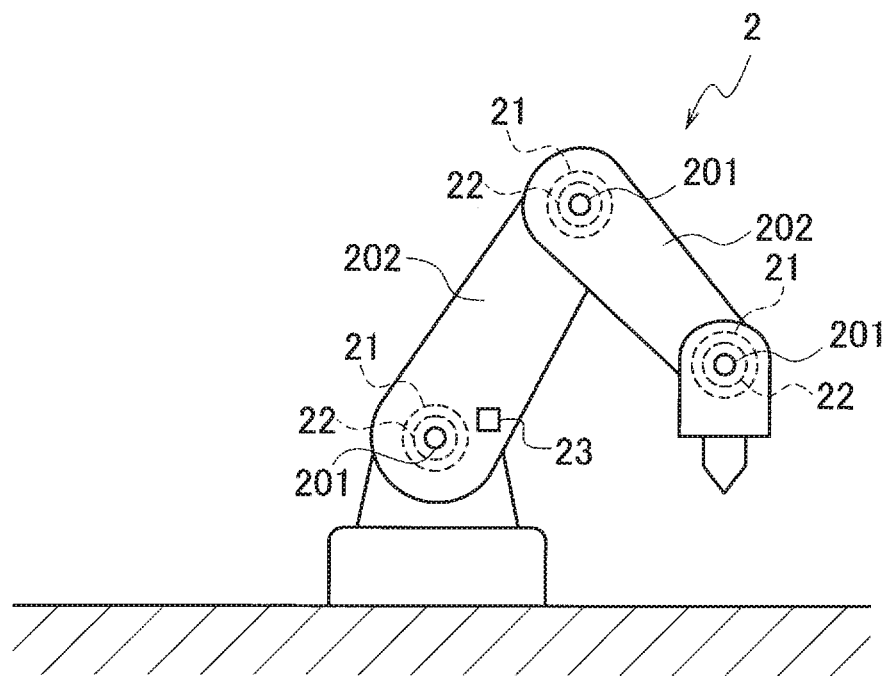
FIG. 2 is a diagram illustrating an arrangement example of a sensor 23 in a work robot 2.

FIG. 2 is a diagram illustrating an arrangement example of the sensor 23 in the work robot 2.

The work robot 2 includes, for example, three rotation axes 201 and each rotation axis 201 is provided with the motor 21 and the decelerator 22. The sensor 23 is arranged, for example, near the decelerator 22 provided for one of the rotation axes 201. The rotation axes 201 are connected to one another by arms 202. Specifically, assuming that the motors 21 and the decelerators 22 are drivers of the arms 202, it can be said that the work robot 2 includes the drivers including the motors 21 and the arms 202 configured to be driven by the drivers.

Returning to FIG. 1, further description is given.

The abnormality detecting device 1 includes an information obtainer 11, a sensor controller 12, a computation processor 13, a display unit 14, a sound output unit 15, a communication unit 16, and a storage unit 17.

The abnormality detecting device 1 includes a general-purpose microcomputer provided with a CPU (central processing unit), a memory, and an input-output unit. A computer program (abnormality detecting program) for causing the microcomputer to function as the abnormality detecting device is installed in the microcomputer. Executing the computer program causes the microcomputer to function as multiple information processing circuits (11 to 13 and 16) included in the abnormality detecting device. Note that, although an example in which the multiple information processing circuits (11 to 13 and 16) included in the abnormality detecting device are implemented by software is described herein, the multiple information processing circuits (11 to 13 and 16) may be formed by preparing dedicated hardware for executing the information processing to be described later as a matter of course. Moreover, the multiple information processing circuits (11 to 13 and 16) may be formed of individual pieces of hardware.

The information obtainer 11 obtains work data necessary for detecting the abnormality from the work robot 2 and stores the work data in the storage unit 17. The work data is described later.

The sensor controller 12 causes the sensor 23 to detect the acceleration when the decelerator 22 operates with an operation of the motor 21. Then, the sensor controller 12 receives the acceleration signal M1 indicating the acceleration of the decelerator 22 from the sensor 23 and transfers the acceleration signal M1 to the computation processor 13.

The computation processor 13 is a controller that detects the abnormality in the work robot 2 based on the acceleration signal M1. The computation processor 13 calculates data on the acceleration signal M1 (detected vibration) and detects the abnormality in the work robot 2 (apparatus) based on the data on the vibration. Specifically, the computation processor 13 determines the abnormality in the apparatus by comparing the data on the vibration with a predetermined threshold TH. Specifically, when the data on the vibration is greater than the threshold TH, the computation processor 13 determines that the there is an abnormality in the work robot 2. In other words, the computation processor 13 determines that failure is expected to occur. Since the data on the vibration is a target to be compared with the threshold TH, this data is referred to as comparison target value hereafter.

Moreover, the computation processor 13 (controller) changes the threshold TH depending on the length of work time (hereafter, referred to as work time length T) required for the work robot 2 to perform a certain work.

Furthermore, the computation processor 13 (controller) changes the threshold TH depending on the length of pause time (hereafter, referred to as pause time length R) in which the work robot 2 pauses between one work A and the next work A, that is the length of pause time in which the work robot 2 pause before the work A.

The display unit 14 displays the work time length T, the pause time length R, the work speed (hereafter, referred to as line speed) being speed at which the apparatus performs the work, and the threshold TH (hereafter, these parameters are collectively referred to as measurement results 140) in real time and is, for example, a liquid crystal monitor.

Note that the line speed (work speed) changes depending on the work time length T and the pause time length R. Specifically, the longer the work time length T is, the lower the line speed (work speed) is. Moreover, the longer the pause time length R is, the lower the line speed (work speed) is. Meanwhile, the shorter the work time length T is, the higher the line speed (work speed) is. Moreover, the shorter the pause time length R is, the higher the line speed (work speed) is.

The communication unit 16 is a unit for transmitting the measurement results 140 to the computer 5 at a remote location (outside) and is, for example, a router for wired LAN or a router for wireless communication (WiFi or the like).

The storage unit 17 stores information necessary for detecting the abnormality in the work robot 2 including the work data obtained by the information obtainer 11.

Figure 3:
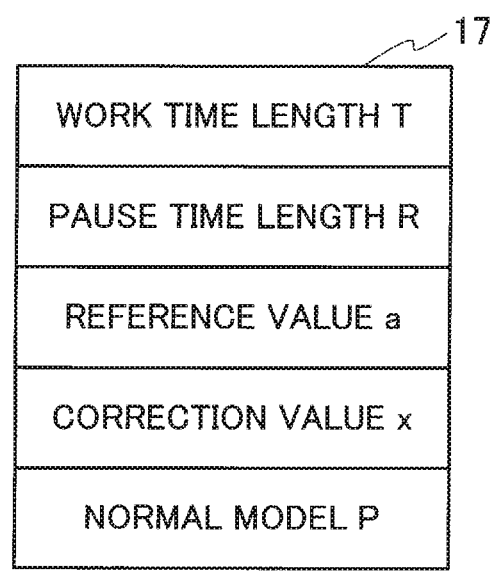
FIG. 3 is a diagram illustrating information stored in a storage unit 17 in the first embodiment.

FIG. 3 is a diagram illustrating the information stored in the storage unit 17 in the first embodiment.

The storage unit 17 stores the work time length T and the pause time length R included in the work data obtained by the information obtainer 11. Moreover, the storage unit 17 stores a reference value a and a correction value x (constant values) for obtaining the threshold TH from the work time length T and the pause time length R and a normal model P obtained from the acceleration signal M1 in the normal operation of the work robot 2, as other information necessary for the detection of abnormality.

The normal operation of the work robot 2 is a state where there is no failure in the work robot 2 and no abnormality is occurring.

The work time length T and the pause time length R are set in the work robot 2 and can be increased or reduced by a worker or the like in the production site 3. The computation processor 13 obtains the work time length T and the pause time length R from the work robot 2 and stores them in the storage unit 17. Note that the work data including the work time length T and the pause time length R may be stored not in the work robot 2 but in data for operating the work robot 2.

The normal model P is generated by using one or more acceleration signals M1 in the normal operation of the work robot 2, and includes an average value, a median value, a maximum value, a minimum value, a variance value, and the like of the acceleration in a frequency characteristic of the acceleration signal M1. Moreover, an AR model which is one of modeling methods of time-series data like the acceleration signal M1 may be employed as the normal model. Moreover, a not-illustrated machine learning unit may generate the normal model P by performing machine learning on the acceleration signal M1. Specifically, the machine learning unit performs machine learning on the acceleration signal M1 in the normal operation of the work robot 2 and extracts the aforementioned predetermined characteristic of the acceleration signal M1 to generate the normal model P and stores the normal model P in the storage unit 17. The machine learning unit may perform the aforementioned learning through, for example, deep learning or perform learning through reinforcement learning.

Note that one or more acceleration signals M1 in the normal operation of the work robot 2 is stored in the storage unit 17 and are used to generate the normal model P.

A specific example of the normal model P is described by using the drawings.

Figure 4:
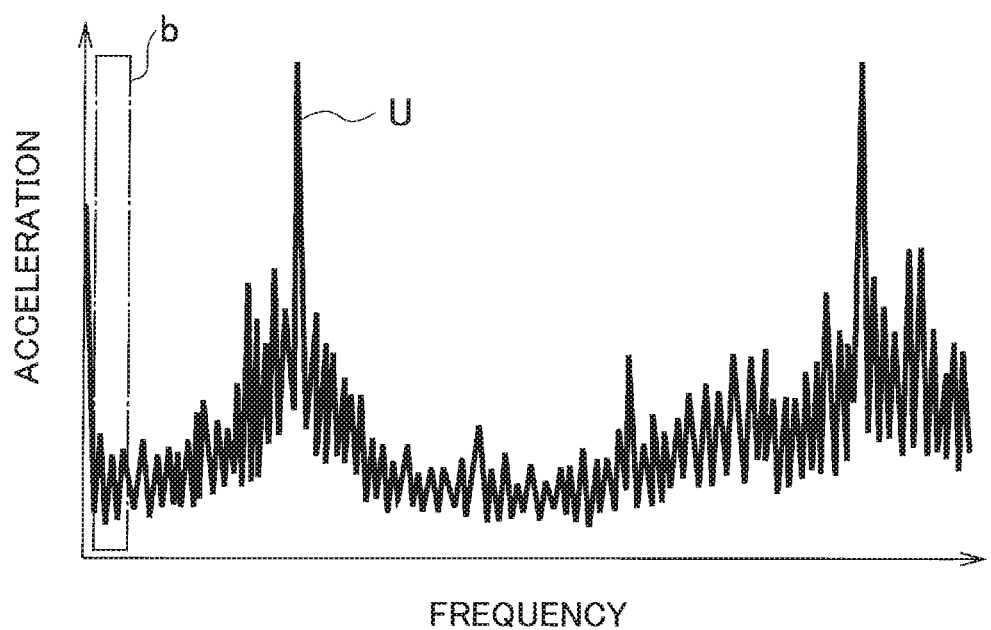
FIG. 4 is a graph illustrating a frequency characteristic U of acceleration in a normal operation of the work robot 2.

In FIG. 4, reference sign U denotes a frequency characteristic of the acceleration signal M1 in the normal operation of the work robot 2. The horizontal axis represents frequency and the vertical axis represents acceleration. In this frequency characteristic, the average value and the variance value of the acceleration (value) within a range indicated by reference sign b are calculated and this calculation is repeated while the range is moved along the axis of frequency (horizontal axis). Different ranges may overlap one another. Specifically, this allows a frequency finely fluctuating depending on time to be considered as a gradual change.

Alternatively, as in general "moving average," it is possible to calculate a frequency characteristic in the range of reference sign b, move the range of reference sign b along the axis of frequency (horizontal axis), add up the frequency characteristics, and calculate the average value and the variance value of the added-up frequency characteristic.

Figure 5:
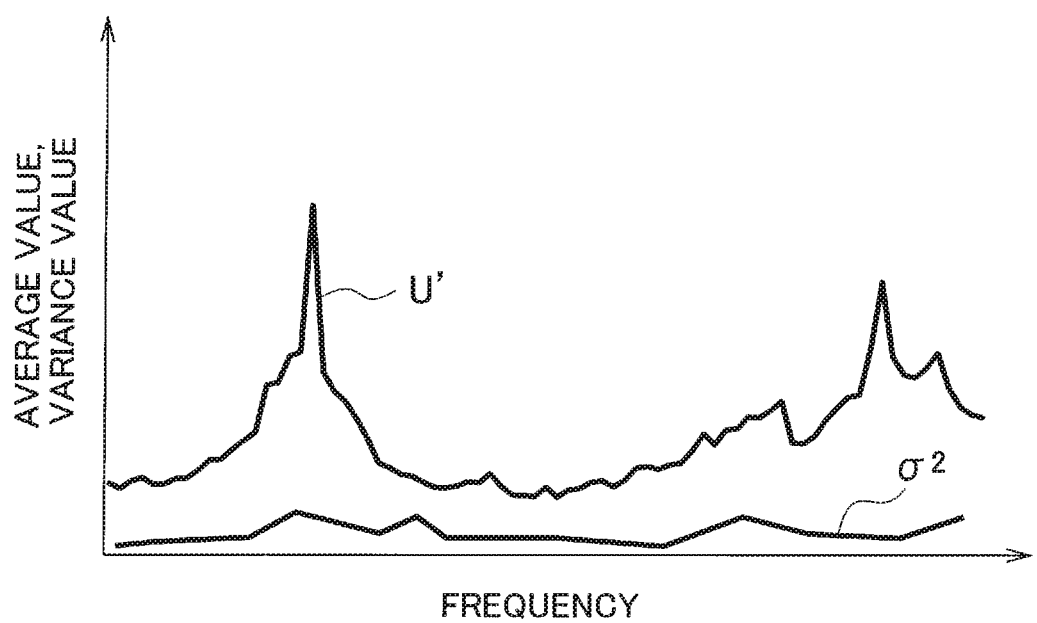
FIG. 5 is a graph illustrating a frequency characteristic U' of an average value and a frequency characteristic $\delta^2$ of a variance value of the acceleration in the normal operation of the work robot 2.

As illustrated in FIG. 5, a frequency characteristic U' of the calculated average value and a frequency characteristic $\delta^2$ of the calculated variance value are thereby obtained. The storage unit 17 stores the frequency characteristic U' and the frequency characteristic $\delta^2$ as the normal model P.

As illustrated in FIG. 5, at a frequency where the average value is high in the frequency characteristic U', the variance value also tends to be high in the frequency characteristic $\delta^2$. However, at a certain frequency, although the average value is high, the variance value is low. It can be said that the reliability of the values at this frequency is high. Moreover, at another certain frequency, although the average value is low, the variance value is high. It can be said that the reliability of the values is low at this frequency.

Note that the frequency range of the normal model P may be limited depending on the type of abnormality to be detected.

Moreover, the normal model P may be updated by using the acceleration signal M1 every time the acceleration signal M1 in the normal operation of the work robot 2 is obtained.

Returning to FIG. 1, further description is given.

The computer 5 is used by an observer or a maintenance personnel monitoring the work robot 2 at a remote location or the like. The computer 5 receives and displays the measurement results 140 and presents a result of abnormality detection and the like to the observer or the like by using an image, sound, voice, vibration, or the like.

Figure 6:
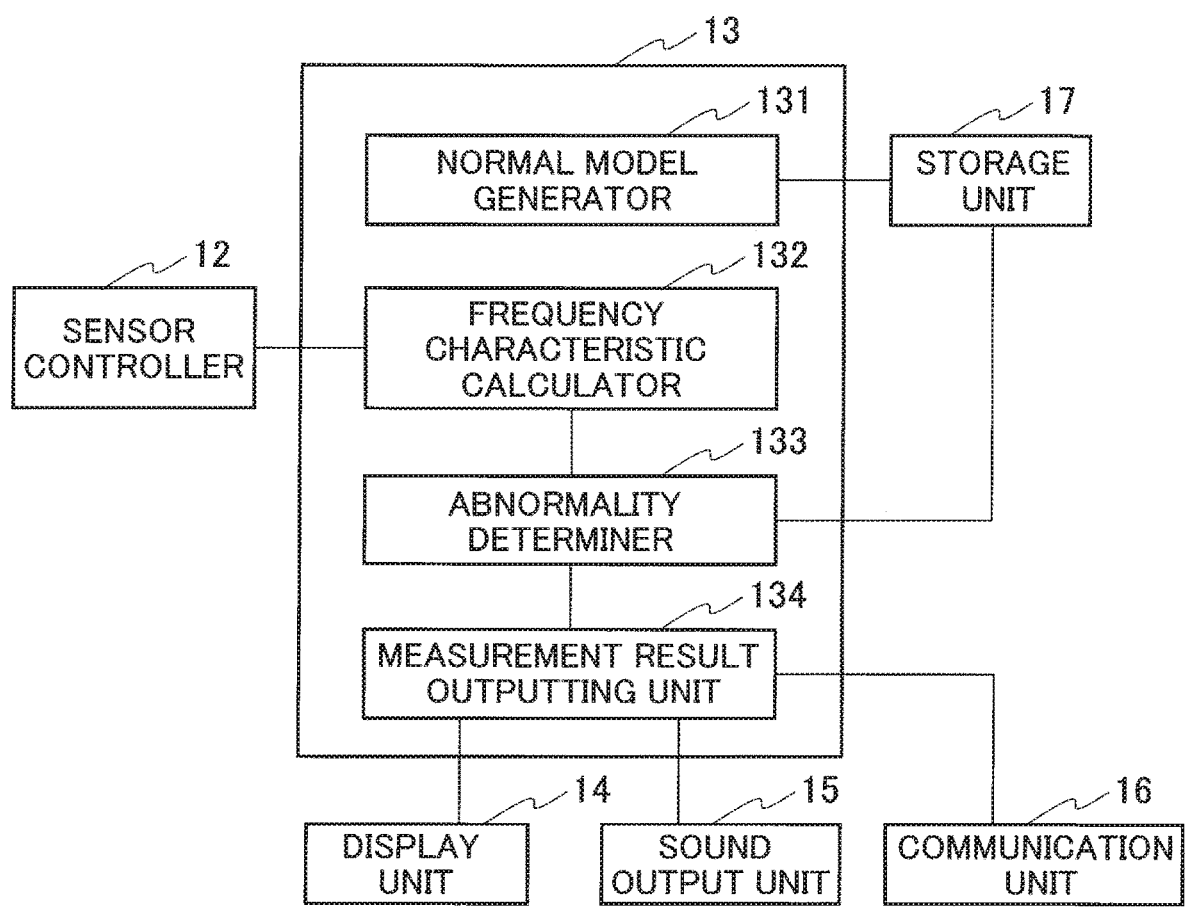
FIG. 6 is a block diagram illustrating a schematic configuration of a computation processor 13.

FIG. 6 is a block diagram illustrating a schematic configuration of the computation processor 13.

The computation processor 13 includes a normal model generator 131, a frequency characteristic calculator 132, an abnormality determiner 133, and a measurement result outputting unit 134.

The normal model generator 131 generates the normal model P and stores it in the storage unit 17.

The frequency characteristic calculator 132 obtains the acceleration signal M1 in the case where the work robot 2 performs the work A from the sensor controller 12 and calculates a frequency characteristic X of the acceleration signal M1 by using FFT (Fast Fourier Transform).

The abnormality determiner 133 determines whether there is an abnormality in the work robot 2 by using the calculated frequency characteristic X and the information read from the storage unit 17. In other words, the abnormality determiner 133 detects the abnormality in the work robot 2.

The measurement result outputting unit 134 displays the measurement results 140 on the display unit 14. Moreover, when there is an abnormality in the work robot 2, the measurement result outputting unit 134 causes the sound output unit 15 to generate an alarm sound or vibration. Moreover, the measurement result outputting unit 134 outputs the measurement results 140 to the communication unit 16.

Figure 7:
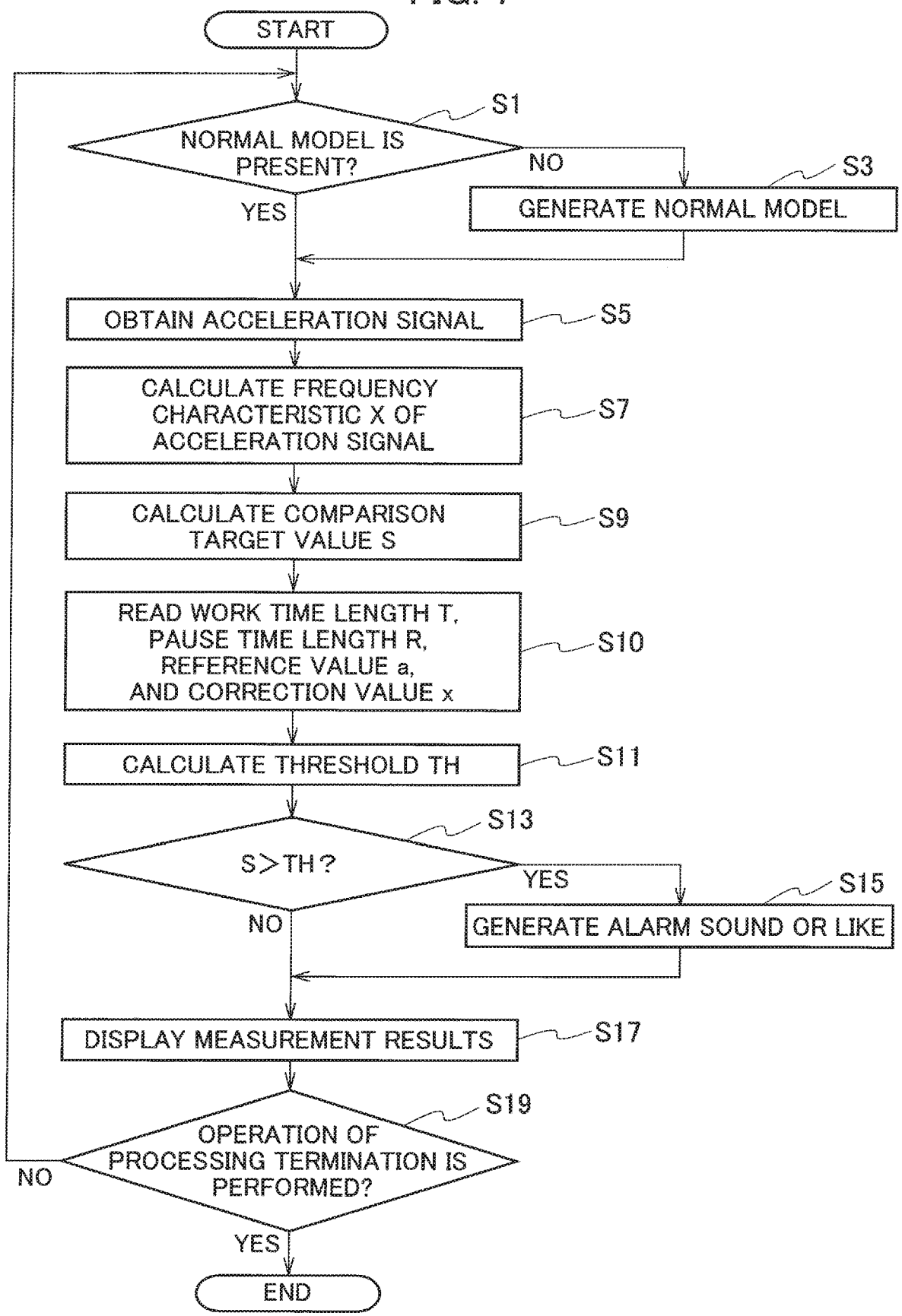
FIG. 7 is a flowchart illustrating a flow of processing of the computation processor 13 in the first embodiment.

FIG. 7 is a flowchart illustrating a flow of processing of the computation processor 13 in the first embodiment.

First, the normal model generator 131 determines whether the normal model P is stored in the storage unit 17 (S1). When no normal model P is stored (S1: NO), the normal model generator 131 generates the normal model P by using the acceleration signal M1 stored in the storage unit 17 and stores the normal model P in the storage unit 17 (S3).

After the execution of step S3 or in the case where the normal model P is stored in the storage unit 17 (S1: YES), the frequency characteristic calculator 132 obtains the acceleration signal M1 in the case where the work robot 2 performs the work A once, from the sensor controller 12 (S5).

There is a possibility that the work robot 2 fails in the future despite normally executing the work A. Accordingly, the computation processor 13 determines whether there is the possibility of future failure, that is whether there is an abnormality by using the obtained acceleration signal M1.

First, the frequency characteristic calculator 132 calculates the frequency characteristic X of the obtained acceleration signal M1 (S7). Note that the frequency characteristic X may be limited to a frequency range depending on the type of abnormality to be detected as in the normal model.

Next, the abnormality determiner 133 reads the normal model P from the storage unit 17 and calculates the comparison target value S by using the frequency characteristic X and the normal model P (S9).

An example of a method of calculating the comparison target value S is described by using the drawings.

Figure 8:
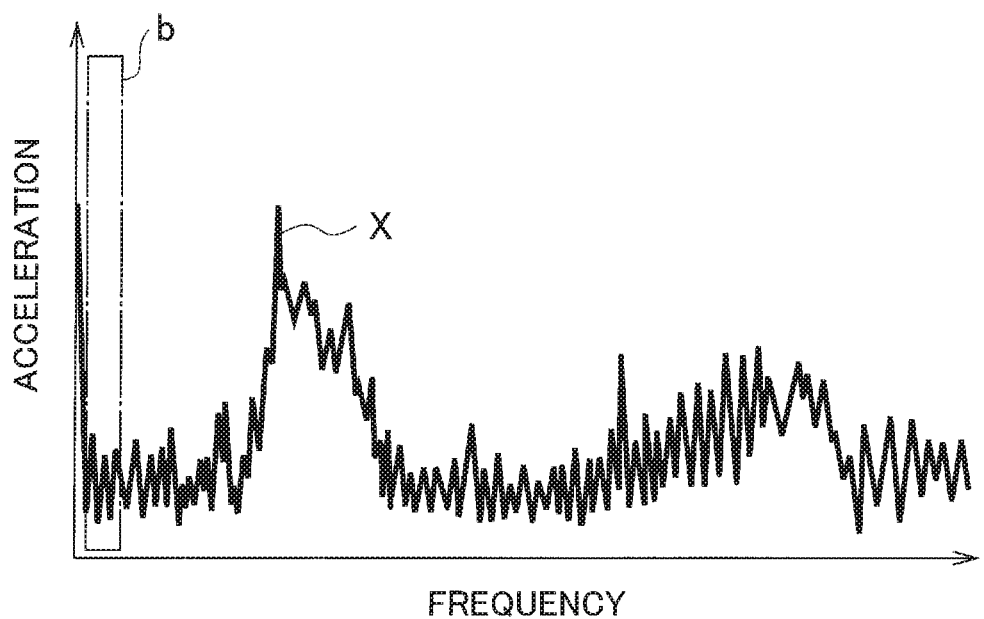
FIG. 8 is a graph illustrating a frequency characteristic X of acceleration in the case where the work robot 2 is working.

In FIG. 8, the reference sign X denotes the frequency characteristic X calculated in step S7. The horizontal axis represents frequency and the vertical axis represents acceleration. In this frequency characteristic X, as in FIG. 5, the average value of the acceleration (value) in the range denoted by reference sign b (FIG. 8) is calculated and the calculation is repeated while moving the range along the axis of frequency (horizontal axis). Different ranges may overlap one another. Alternatively, as in general "moving average," it is possible to calculate a frequency characteristic in the range of reference sign b, then move the range of reference sign b along the axis of frequency (horizontal axis), add up the frequency characteristics, and calculate the average value and the variance value of the added-up frequency characteristic.

Figure 9:
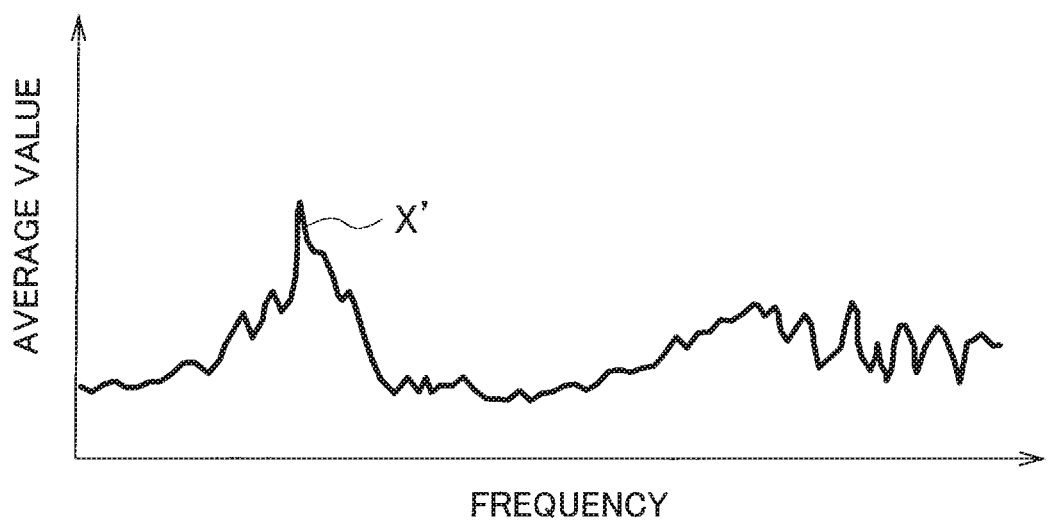
FIG. 9 is a graph illustrating a frequency characteristic X' of an average value of the acceleration in the case where the work robot 2 is working.

As illustrated in FIG. 9, a frequency characteristic X' of the calculated average value is thereby obtained.

Figure 10:
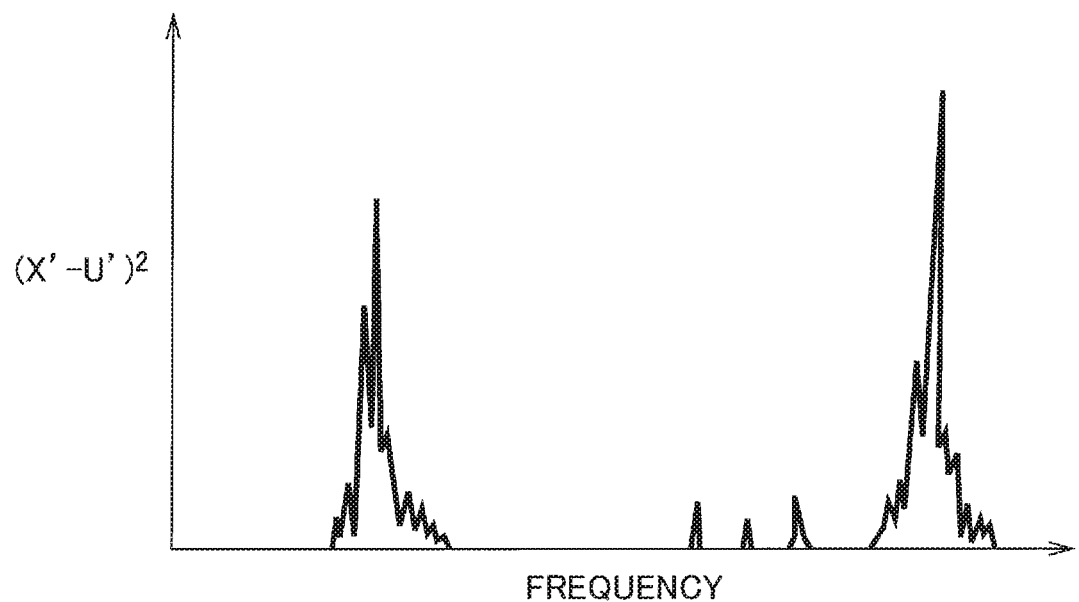
FIG. 10 is a graph illustrating a frequency characteristic of $(X'-U')^2$.

Next, as illustrated in FIG. 10, a frequency characteristic of $(X'-U')^2$ is calculated by using the frequency characteristic X of the observed value and the frequency characteristic U' of the normal model P of the reference value. A positive value can be obtained also in the case of U'>X' by squaring X'-U' as described above and the case where a positive value and a negative value cancel each other out can be prevented.

Note that the frequency characteristic of $(X'-U')^2$ includes a component of the frequency assumed to have low reliability in the description of FIG. 5 and has low reliability.

Figure 11:
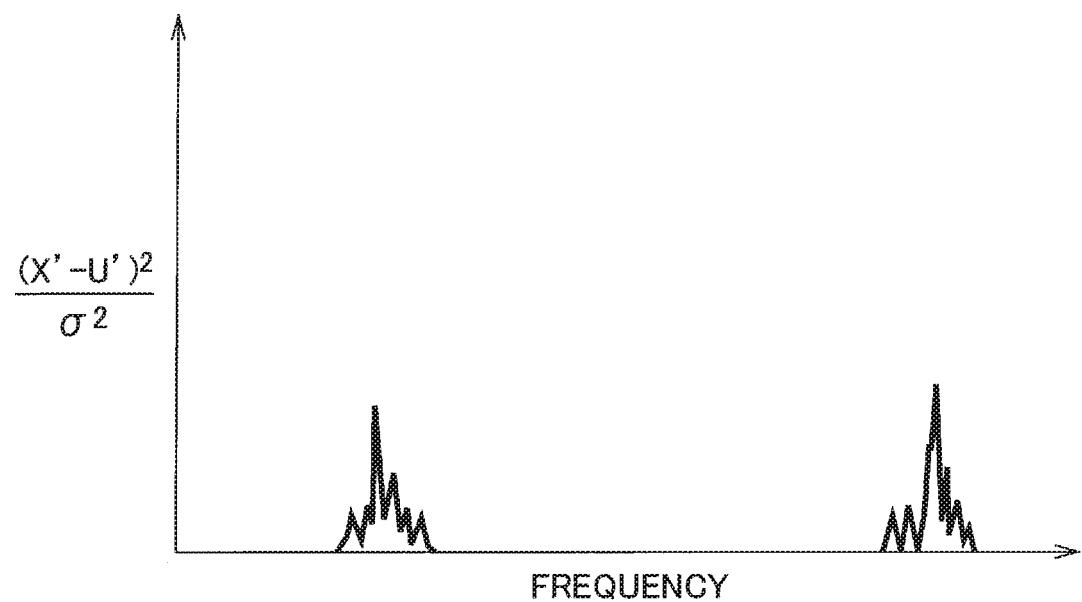
FIG. 11 is a graph illustrating a frequency characteristic of $(X'-U')^2/\delta^2$.

Next, as illustrated in FIG. 11, a frequency characteristic of $(X'-U')^2/\delta^2$ is calculated by using the frequency characteristic of $(X'-U')^2$ and the frequency characteristic $\delta^2$ of the normal model P. Specifically, the degree of abnormality is defined as $(X'-U')^2/\delta^2$ and the frequency characteristic thereof is calculated. An abnormality value can be referred to as a difference to a value in the normal operation of the work robot 2.

Correcting the frequency characteristic of $(X'-U')^2$ by using the frequency characteristic $\delta^2$ as described above reduces the component of the frequency assumed to have low reliability in the description of FIG. 5 and can improve the reliability of the frequency characteristic of $(X'-U')^2/\delta^2$. Accordingly, the accuracy of abnormality detection in the processing to be described later can be improved.

Next, a value (added-up value) obtained by adding up values (abnormality values) at respective frequencies of $(X'-U')^2/\delta^2$ is calculated and the added-up value is set as the comparison target value S. Note that the frequency range for which the comparison target value S is calculated may be limited. For example, the comparison target value S may be calculated for a high frequency band. Moreover, an integrated value of a predetermined frequency range in $(X'-U')^2/\delta^2$ may be set as the comparison target value S.

Moreover, in the case where the acceleration signals M1 are received for the accelerations in the three directions orthogonal to one another, a total value of the comparison target values S calculated as described above may be set as the comparison target value S.

In summary, the computation processor 13 calculates a first frequency characteristic (X) that is the frequency characteristic of the vibration detected in the abnormality determination of the work robot 2. Then, the computation processor 13 sets a value according to a difference between the first frequency characteristic (X) and a second frequency characteristic (U) that is the frequency characteristic of the vibration in the normal operation of the work robot 2, as the comparison target value.

Moreover, the computation processor 13 sets the square value of the difference between the average value (X') of the values in the first frequency characteristic (X) and the average value (U') of the values in the second frequency characteristic (U), that is the value according to $(X'-U')^2$, as the comparison target value.

Furthermore, the computation processor 13 sets the value according to the value obtained by correcting the square value with the variance value ($\delta^2$) of the second frequency characteristic, as the comparison target value.

Returning to FIG. 7, further description is given.

The abnormality determiner 133 reads the work time length T, the pause time length R, the reference value a, and the correction value x from the storage unit 17 (S10) and calculates the threshold TH by using the following formula (S1).

$$TH = a \times T \times R + x$$

As described in this formula, the abnormality determiner 133 calculates the threshold TH such that the shorter the work time length T is, the smaller the threshold TH is set. In other words, the higher the work speed of performing the work A once is, the smaller the threshold TH is set, the work speed being inversely proportional to the work time length T. Moreover, the higher the work speed (line speed) of all works A repeatedly performed is, the smaller the threshold TH is set.

Moreover, the abnormality determiner 133 also calculates the threshold TH such that the shorter the pause time length R is, the smaller the threshold TH is set as described in this formula. Specifically, the abnormality determiner 133 sets the threshold TH such that the higher the line speed is, the smaller the threshold TH is set, by setting the threshold TH such that the shorter the pause time length R is, the smaller the threshold TH is set.

The configuration may be such that the work data includes the line speed and the work time length T and the pause time length R is calculated from the line speed and the work time length T. Alternatively, the configuration may be such that the work data includes the line speed and the pause time length R and the work time length T is calculated from the line speed and the pause time length R. Moreover, the formula for obtaining the threshold is not limited to a linear formula like the formula described above and may be any formula in which the shorter the work time length T is, the smaller the threshold is set and the shorter the pause time length R is, the smaller the threshold is set. In other words, any formula may be used as long as the higher the line speed is, the smaller the threshold is set. Furthermore, the threshold TH does not have to be set by using all of the work time length T, the pause time length R, and the work speed and may be set based on at least one of the work time length T, the pause time length R, and the work speed.

Next, the abnormality determiner 133 determines whether the comparison target value S is greater than the threshold TH (S13). Specifically, the abnormality determiner 133 determines the level of abnormality by using the comparison target value S assuming that the comparison target value S is a value indicating abnormality.

When the comparison target value S is greater than the threshold TH (S13: YES), the abnormality determiner 133 determines that failure is to occur in the work robot 2 in the future, that is there is an abnormality in the work robot 2. The measurement result outputting unit 134 causes the sound output unit 15 to generate the alarm sound or vibration to notify this determination to a worker or the like (S15).

When the comparison target value S is equal to or less than the threshold TH (S13: NO), the abnormality determiner 133 determines that there is no abnormality, that is there is no sign of failure.

After the execution of step S15 or in the case where the comparison target value S is equal to or less than the threshold TH (S13: NO), the processing proceeds to step S17.

As described above, the abnormality determiner 133 detects the abnormality as the sign of apparatus failure, based on the comparison target value S. Specifically, the abnormality determiner 133 determines that there is an abnormality in the apparatus when the comparison target value S is greater than the threshold TH. Moreover, the abnormality determiner 133 changes the threshold TH depending on the work time length T.

Note that, if we assume that the sum of the work time length T and the pause time length R is the work time length (hereafter, referred to as work time length TR), it can be said that changing the threshold TH depending on the pause time length R is equivalent to changing the threshold TH depending on the work time length TR. Accordingly, an abnormality in the apparatus can be detected by using a criterion for determination depending on the length of the work time (T or TR).

Moreover, the abnormality determiner 133 sets the threshold TH such that the shorter the work time length (T or TR) is, that is the higher the line speed (work speed) is, the smaller the threshold TH is set. Accordingly, it is possible to predict failure in the apparatus at a stage where the comparison target value S is relatively small, that is at an early stage. In other words, even if the time to failure in the apparatus is short, it is possible to quickly shutdown the apparatus and perform maintenance on the apparatus. Moreover, when only certain failure has such a characteristic that the higher the work speed is, the shorter the time to the failure is, occurrence of such failure can be predicted.

In step S17, the measurement result outputting unit 134 displays the measurement results 140 including the work time length T, the pause time length R, the result of determination in step S15 (result of abnormality detection), the threshold TH, and the like on the display unit 14 (S17). Moreover, the measurement result outputting unit 134 outputs the measurement results 140 to the communication unit 16.

The communication unit 16 transmits the measurement results 140 to the computer 5 (S17). The computer 5 displays the measurement results 140. Moreover, when there is an abnormality in the work robot 2, the computer 5 generates a sound, a voice, or vibration. The observer or the maintenance personnel can recognize whether there is an abnormality in the work robot 2 based on the measurement results 140, the generated sound, or the like.

Next, the computation processor 13 determines whether the worker in the production site 3 or the like has performed an operation of processing termination on the abnormality detecting device 1 (S19). When no operation is performed, the processing returns to step S1. When the operation is performed, the processing is terminated.

Figures 12, 13:
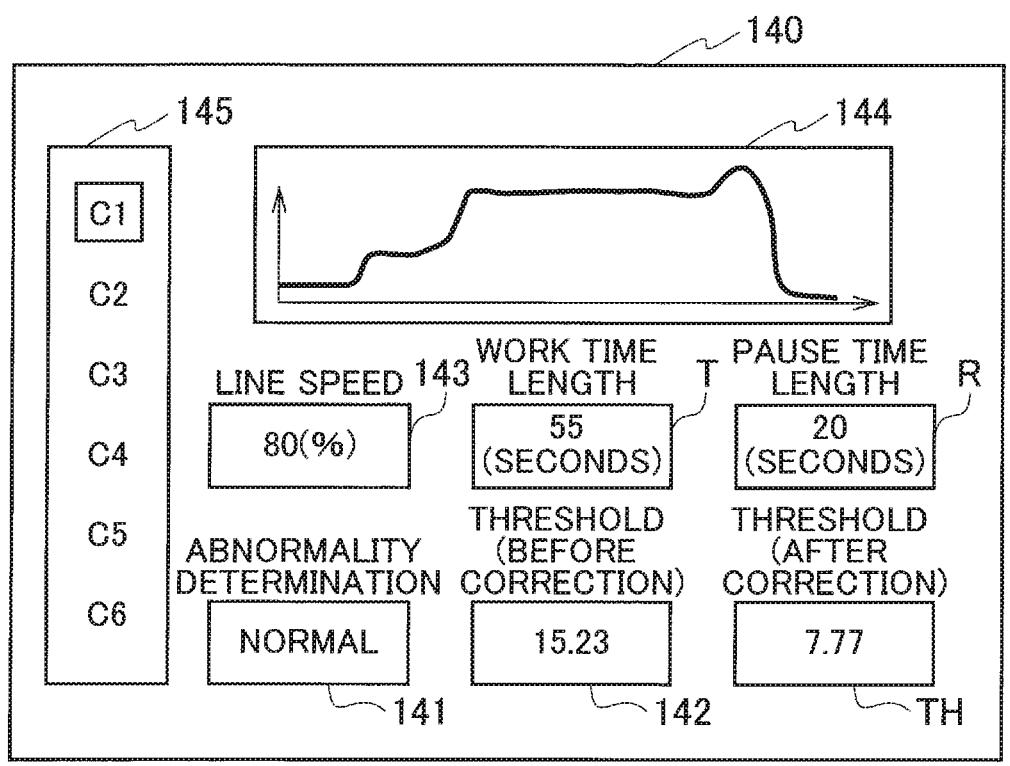
FIG. 12 is a view illustrating a display example of measurement results 140.
FIG. 13 is a view illustrating information stored in the storage unit 17 of a second embodiment.

FIG. 12 is a view illustrating a display example of the measurement results 140, The display unit 14 and the computer 5 displays the measurement results 140 in, for example, an image as illustrated in FIG. 12.

The work time length T, the pause time length R., the threshold TH are displayed in display regions of the display unit 14 and the computer 5 as the measurement results 140. Moreover, for example, when the comparison target value S is determined to be equal to or less than the threshold TH in step S13, display information 141 indicating that the work robot 2 is normally operating is displayed. Note that, when the comparison target value S is determined to be greater than the threshold TH in step S13, display information 141 indicating that there is an abnormality in the work robot 2 is displayed. When the work robot 2 is normally operating, the display information indicating that the work robot 2 is normally operating is displayed.

Moreover, display information 142 indicating a threshold obtained by using a fixed work time length and a fixed pause time length that are references instead of using the actual work time length T and the actual pause time length R is displayed. When this threshold is considered as the threshold before the correction, the threshold TH can be considered as the threshold after the correction.

Moreover, display information 143 indicating the line speed is displayed. The line speed is expressed in, for example, percentage, where reference line speed is 100%. Moreover, display information 144 indicating values of an angle of the arm of the work robot 2 over time is displayed. Furthermore, display information 145 indicating a work type (for example, a vehicle type of a vehicle manufactured by the work A) of the work A is displayed.

As described above, the abnormality detecting device 1 of the first embodiment includes the controller (computation processor 13) that detects an abnormality in the apparatus based on the data (comparison target value S) on the vibration detected in the apparatus (2). The computation processor 13 determines the abnormality in the apparatus by comparing the data (S) on the detected vibration with the predetermined threshold TH. Moreover, the computation processor 13 changes the threshold TH depending on the length of work time (T, TR) in which the apparatus performs the certain work. Accordingly, whether there is an abnormality in the apparatus or not varies depending on the length of work time even for the same comparison target value S, that is the abnormality in the apparatus can be detected by using the criterion for determination depending on the length of work time. Moreover, since the threshold TH is changed depending on the length of work time, accuracy of abnormality detection can be improved.

The following method can be given as a method of abnormality detection different from that of the first embodiment. For example, there is a method in which a frequency spectrum obtained by performing frequency analysis on the output of the sensor during the operation of the robot or a pattern of change in the spectrum over time is compared with a standard frequency spectrum or a pattern of change in the standard frequency spectrum over time to detect an abnormality. This abnormality detecting method has a problem that detection of difference is cumbersome and the reason of abnormality determination based on work contents is obscure. However, the first embodiment and the following embodiments require no such comparison and can solve this problem.

Moreover, since detecting an abnormality means predicting failure of the apparatus, failure prediction timing can be changed depending on the length of work time. Specifically, it is possible to make the prediction timing earlier when the time to failure is short and make the prediction timing later when the time to failure is long. Making the prediction timing earlier enables maintenance of the apparatus (fixing of the apparatus or the like) to be performed with a margin. In other words, when the work time is short (work speed is high), the abnormality can be detected in an early stage. Meanwhile, when the work time is long (work speed is low), the timing of abnormality detection is made later and this can prevent an inconvenience in which the abnormality is detected too early. Moreover, the aforementioned abnormality detecting method performed by the abnormality detecting device 1 can similarly detect the abnormality in the apparatus by using the criterion for determination depending on the length of work time.

The computation processor 13 sets the threshold TH based on at least one of the work time length T indicating the length of work time, the pause time length R indicating the length of the pause time in which the apparatus pauses, and the work speed being the speed at which the apparatus performs the work. Accordingly, this method can handle, for example, the case where the work time length T changes due to changing of the work speed made without changing of the pause time length R, the case where the work time length T changes due to changing of the pause time length R made without changing of the work speed, and the case where the work speed changes due to changing of the pause time length R made without changing of the work time length T.

Moreover, the apparatus (2) includes the rotation mechanism (21, 22) and the computation processor 13 calculates the data (S) on the vibration from the signal outputted from the vibration sensor (23) attached to the apparatus. Accordingly, it is possible to detect the abnormality in the apparatus including the rotation mechanism by using the criterion for determination depending on the length of work time for the apparatus.

Furthermore, the shorter the work time (T, TR) is, the smaller the threshold is set by the computation processor 13. Accordingly, when failure is such that the shorter the work time is, the shorter the time to the failure is, the computation processor 13 can detect the abnormality as a sign of such failure and improve the detection accuracy.

Moreover, the shorter the pause time (R) in which the apparatus pauses before the work is, the smaller the threshold is set by the computation processor 13. Accordingly, when the pause time (R) is short, the threshold is set to a smaller value even if the work time length T is fixed. As a result, when failure is such that the shorter the pause time (R) is, the shorter the time to the failure is, the computation processor 13 can detect the abnormality as a sign of such a failure and improve the detection accuracy.

Furthermore, the computation processor 13 obtains the work data including the length of work time (T, TR), calculates the data on the vibration from the signal outputted by the vibration sensor (23) attached to the apparatus, and determines whether there is an abnormality in the apparatus based on the calculated data on the vibration and the threshold calculated by using the length of work time included in the work data. Accordingly, when the time to failure varies depending on the length of work time, the computation processor 13 can detect the abnormality as a sign of such failure and improve the detection accuracy.

Moreover, the higher the work speed (line speed) is, the smaller the threshold is set by the computation processor 13. Accordingly, when the work speed (line speed) is high, the threshold is set to a smaller value even if the work time length T and the pause time length R are fixed. As a result, when failure is such that the higher the work speed (line speed) is, the shorter the time to the failure is, the computation processor 13 can detect the abnormality as a sign of such failure and improve the detection accuracy.

In other words, the computation processor 13 can detect the abnormality in the apparatus by using the criterion for determination depending on the length of work time when the work time length (TR) is reduced by changing the work speed, when the work time (T) is reduced by increasing the pause time (R) without changing the work speed, and when the length of pause time between one work and another work is changed.

The computation processor 13 calculates the first frequency characteristic (X) that is the frequency characteristic of the detected vibration of the apparatus and sets the value according to the difference between the first frequency characteristic (X) and the second frequency characteristic (U) that is the frequency characteristic of the vibration of the apparatus in the normal operation of the apparatus, as the comparison target value S (data on the vibration). Accordingly, the computation processor 13 can detect an abnormality based on the difference between the frequency characteristics and thus improve the accuracy of abnormality detection.

Furthermore, the computation processor 13 sets the value according to the square value of the difference between the average value (X') of the values in the first frequency characteristic (X) being the observed values and the average value (U) of the values in the second frequency characteristic (U) being the reference values, namely, $(X'-U')^2$, as the comparison target value S (data on the vibration). Accordingly, the computation processor 13 can prevent the case where a positive value and a negative value cancel each other out in the difference between the first frequency characteristic and the second frequency characteristic and thus improve the accuracy of abnormality detection.

Moreover, the computation processor 13 sets the value according to the value obtained by correcting the square value with the variance value (62) of the second frequency characteristic, as the comparison target value S (data on the vibration). Accordingly, the load of calculation is smaller than that in fitting of frequency waveform and the processing time can be reduced. Moreover, the accuracy of abnormality detection can be improved by using statistics.

Furthermore, when the comparison target value (data on the vibration) is greater than the threshold, the computation processor 13 notifies the user that there is an abnormality in the apparatus (S15, S17). Accordingly, the worker in the production site or the observer or maintenance personnel monitoring the apparatus can recognize that there is an abnormality in the apparatus, that is the failure is predicted, and perform maintenance of the apparatus.

Moreover, the apparatus includes the driver including the rotation mechanism (21, 22) and the arm (202) driven by the driver. Thus, the abnormality can be detected for such an apparatus by using the criterion for determination depending on the length of work time.

Second Embodiment

Next, a second embodiment is described. In this section, differences from the first embodiment are mainly described and description of the same or similar contents is omitted since it is redundant.

In the second embodiment, description is given of the case where the contents of the work A vary depending on the type of work (hereafter, referred to as work type). For example, in one work type, there is no movement of the arm of the work robot 2 and a welding work is performed in the work A. Moreover, in another work type, the work robot 2 performs a chip dressing work in the work A. It is assumed that the work type is set in the work robot 2 in advance and can be obtained from the work robot 2.

FIG. 13 is a view illustrating information stored in the storage unit 17 of the second embodiment.

For example, the work types are assumed to include work types C1, C2, and C3. Moreover, a combination of the work time length T and the pause time length R is assumed to vary among the work types. Specifically, at least one of the work time length T and the pause time length R varies between different work types. Thus, the frequency characteristic of the acceleration signal M1 varies between different work types. Accordingly, the normal model varies between different work types. Moreover, the threshold TH also varies between different work types.

The storage unit 17 stores a normal model P1 for a work of the work type C1, in association with the work type C. Moreover, the storage unit 17 stores a normal model P2 for a work of the work type C2, in association with the work type C2. Furthermore, the storage unit 17 stores a normal model P3 for a work of the work type C3, in association with the work type C3. The normal models P1, P2, and P3 include thresholds TH1, TH2, and TH3 for the corresponding work types, respectively.

Moreover, as in the first embodiment, each threshold is set such that the shorter the work time length T is, the smaller the threshold is set. Furthermore, each threshold is set such that the shorter the pause time length R is, the smaller the threshold is set.

Note that, when each work type is determined depending on a combination of multiple elements, it is only necessary to set an identification number for each combination and store the normal model (including the threshold) in association with the identification number. Elements determining the work type include presence or absence of movement of the arm in the work robot being the apparatus, a stop state of the arm, a welding work by the work robot, a chip dressing work by the work robot, and the like.

For example, when the work type varies depending on a vehicle type of an automobile to be manufactured by the work robot 2, the normal model (including the threshold) may be stored in association with the vehicle type serving as the work type.

Moreover, the number of work types may be two or four or greater.

Figure 14:
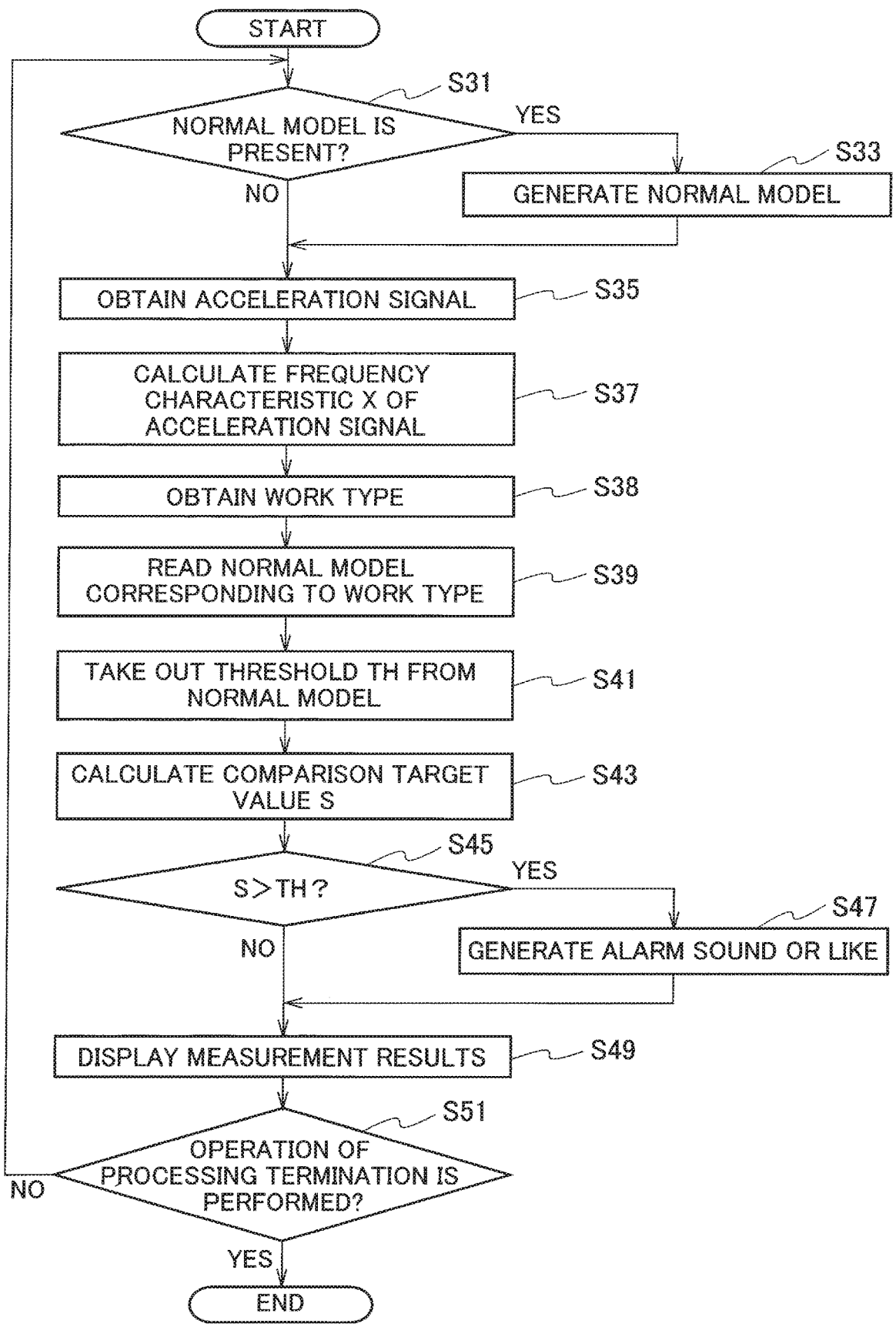
FIG. 14 is a flowchart illustrating a flow of processing of the computation processor 13 in the second embodiment.

FIG. 14 is a flowchart illustrating a flow of processing of the computation processor 13 in the second embodiment.

First, the normal model generator 131 determines whether the normal models for all work types are stored in the storage unit 17 (S31). Then, when the normal model for at least one of the work types is not stored (S31: NO), the normal model generator 131 generates the normal model by using the acceleration signal M1 stored in the storage unit 17 and stores the normal model in the storage unit 17 (S33). The generated normal model includes the threshold TH.

After the execution of step S33 or in the case where the normal models for all work types are stored in the storage unit 17 (S31: YES), the frequency characteristic calculator 132 obtains the acceleration signal M1 in the case where the work robot 2 performs the work A once, from the sensor controller 12 (S35).

Next, the frequency characteristic calculator 132 calculates the frequency characteristic X of the obtained acceleration signal M1 (S37).

Then, the abnormality determiner 133 obtains the work type of the work A to be performed by the work robot 2, from the work robot 2 (S38) and reads the normal model corresponding to the obtained work type from the storage unit 17 (S39). Note that the abnormality determiner 133 may obtain the work type from the data for operating the work robot 2.

Next, the abnormality determiner 133 takes out the threshold (hereafter, referred to as threshold TH) from the read normal model (S41).

Then, the abnormality determiner 133 calculates the comparison target value S as in the first embodiment by using the frequency characteristic X calculated in step S37 and the normal model read in step S39 (S43).

Next, the abnormality determiner 133 determines whether the comparison target value S is greater than the threshold TH taken out in the step S41 (S45). In other words, the abnormality determiner 133 determines whether there is an abnormality in the work robot 2.

Since the threshold TH changes depending on the work type, it can be said that the abnormality determiner 133 changes the threshold depending on the work type. Moreover, it can be also said that the abnormality determiner 133 selects the threshold to be used by the computation processor 13 from the multiple thresholds stored in the storage unit 17 in advance and uses the selected threshold.

When the comparison target value S is greater than the threshold TH (S45: YES), the abnormality determiner 133 determines that failure of the work robot 2 is predicted, that is there is an abnormality in the work robot 2 and the measurement result outputting unit 134 causes the sound output unit 15 to generate the alarm sound or vibration to notify this determination to the worker or the like (S47).

When the comparison target value S is equal to or less than the threshold TH (S45: NO), the abnormality determiner 133 determines that there is no abnormality. After the execution of step S47 or in the case where the comparison target value S is equal to or less than the threshold TH (S45: NO), the processing proceeds to step S49.

In step S49, the measurement result outputting unit 134 displays the measurement results 140 on the display unit 14 as in the first embodiment (S49). Moreover, the measurement result outputting unit 134 outputs the measurement results 140 to the communication unit 16.

The communication unit 16 transmits the measurement results 140 to the computer 5 (S49). The computer 5 displays the measurement results 140. Moreover, when there is an abnormality in the work robot 2, the computer 5 generates a sound, a voice, or vibration. The observer or the maintenance personnel can recognize whether there is an abnormality in the work robot 2 based on the measurement results 140, the generated sound, or the like.

Next, the computation processor 13 determines whether the worker in the production site 3 or the like has performed an operation of processing termination on the abnormality detecting device 1 (S51). When no operation is performed, the processing returns to step S31. When the operation is performed, the processing is terminated.

As described above, in the second embodiment, the computation processor 13 further obtains the work type of the work and changes the threshold depending on the length of work time and the work type. Accordingly, when the length of work time (T, TR) changes depending on the length of work time and the work type, the computation processor 13 can detect an abnormality in the apparatus based on the criterion for determination depending on the length of work time and the work type. Moreover, detecting an abnormality means predicting failure of the apparatus. Accordingly, when the time to failure varies depending on the work type, the computation processor 13 can detect the abnormality as a sign of such failure and improve the accuracy of detection.

Since the computation processor 13 selects the threshold depending on the length of work time (T, TR) from the multiple thresholds stored in advance and uses the selected threshold, the computation processor 13 does not have to calculate the threshold depending on the length of work time and can detect an abnormality in the apparatus by using the criterion for determination depending on the length of work time.

Moreover, the abnormality detecting device 1 includes the storage unit 17 that stores the normal models generated from the second frequency characteristic (U) in association with the respective work types. Furthermore, each normal model includes the threshold. Moreover, the computation processor 13 reads the normal model corresponding to the work type of the work to be performed by the apparatus from the storage unit 17 (S39) and takes out the threshold from the normal model (S41). Then, the computation processor 13 calculates the second frequency characteristic (U) from the read normal model and determines whether the comparison target value (data on the vibration) calculated by using the calculated second frequency characteristic is greater than the read threshold (S45). Accordingly, when the length of work time (T, TR) varies depending on the work type, the computation processor 13 can detect an abnormality in the apparatus by using the criterion for determination depending on the length of work time.

Third Embodiment

Next, a third embodiment is described. In this section, differences from the first and second embodiments are mainly described and description of the same or similar contents is omitted since it is redundant.

In the third embodiment, description is given of the case where the contents of the work A vary depending on the work type as in the second embodiment.

Figure 15:
FIG. 15 is a view illustrating information stored in the storage unit 17 of a third embodiment.

FIG. 15 is a view illustrating information stored in the storage unit 17 of the third embodiment.

The storage unit 17 stores a normal model P11 for the work of the work type C1, in association with the work type C1. Moreover, the storage unit 17 stores a normal model P12 for the work of the work type C2, in association with the work type C2. Furthermore, the storage unit 17 stores a normal model P13 for the work of the work type C3, in association with the work type C3.

The normal models P11, P12, and P13 include reference values a1, a2, and a3 for the corresponding work types, respectively. The reference values a1, a2, and a3 are used instead of the reference value a in the first embodiment. In this example, assume that the contents of work vary among the work types and the reference value also varies among the work types.

Note that the normal models (including reference values) may be stored in association with the identification numbers for the respective work types as in the second embodiment.

Moreover, the normal models (including reference values) may be stored in association with the vehicle types serving as the work types as in the second embodiment.

Furthermore, the number of work types may be two or four or greater.

Moreover, the storage unit 17 stores the correction value x (not illustrated) as in the first embodiment.

Figure 16:
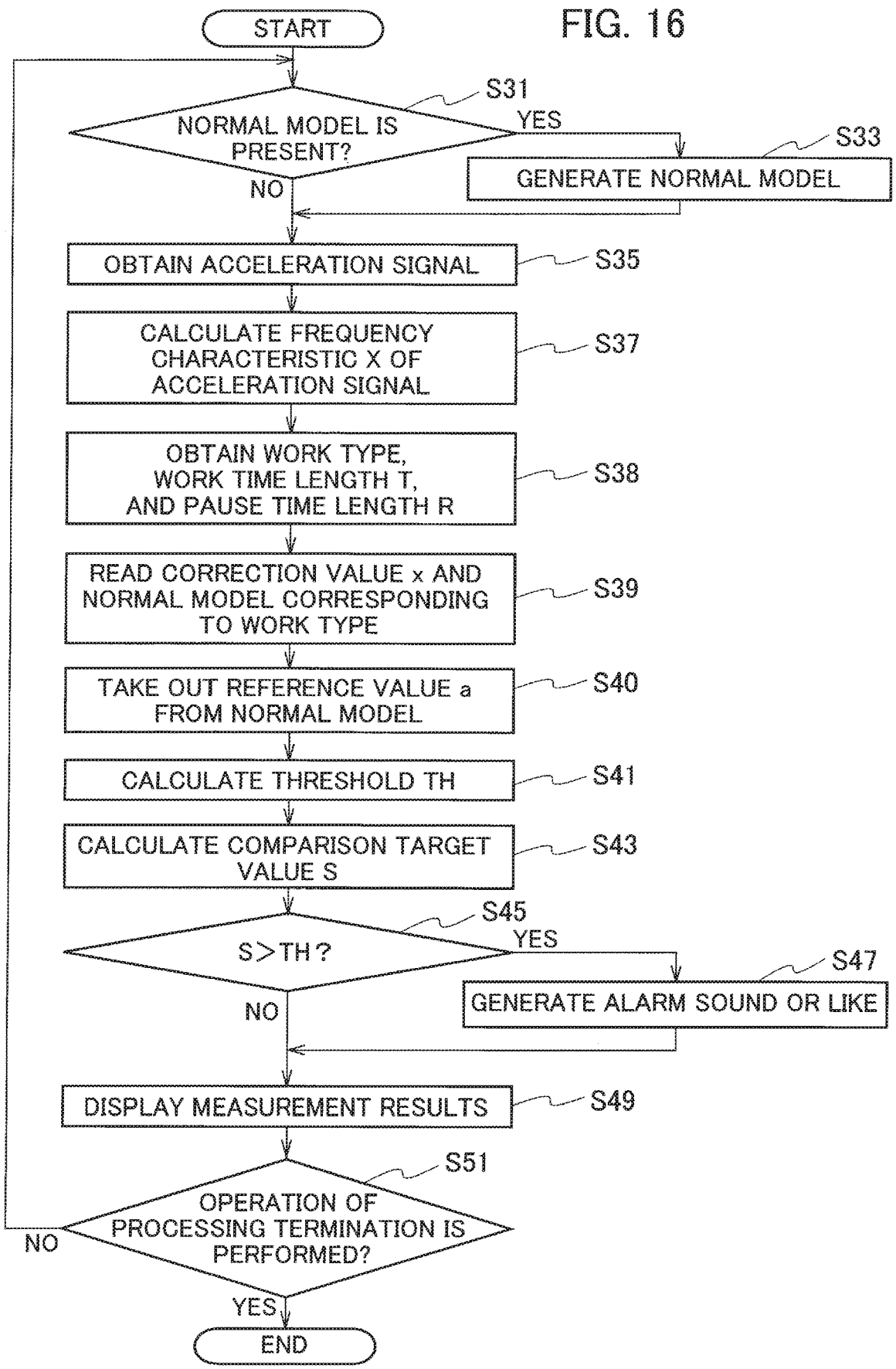
FIG. 16 is a flowchart illustrating a flow of processing of the computation processor 13 in the third embodiment.

FIG. 16 is a flowchart illustrating a flow of processing of the computation processor 13 in the third embodiment.

In this section, only the differences from the second embodiment are described.

Step S37 and prior are the same as those in the second embodiment.

In subsequent step S38, the abnormality determiner 133 obtains the work type of the work A to be performed by the work robot 2, the work time length T, and the pause time length R from the work robot 2 (S38) and reads the correction value x and the normal model corresponding to the obtained work type from the storage unit 17 (S39). Note that the abnormality determiner 133 may obtain the work type, the work time length T, and the pause time length R from the data for operating the work robot 2.

Next, the abnormality determiner 133 takes out the reference value (hereafter, referred to as reference value a) from the read normal model (S40) and calculates the threshold TH based on the work time length T, the pause time length R, the reference value a, and the correction value x as in the first embodiment (S41).

Since the threshold TH changes depending on the reference value and the reference value changes depending on the work type, it can be said that the abnormality determiner 133 changes the threshold depending on the work type.

Next, the abnormality determiner 133 calculates the comparison target value S as in the first embodiment by using the frequency characteristic calculated in step S37 and the normal model read in step S39 (S43).

Steps hereafter are the same as those in the second embodiment.

As described above, in the third embodiment, the computation processor 13 further obtains the work type of the work and changes the threshold depending on the length of work time and the work type. Accordingly, when the length of work time (T, TR) changes depending on the length of work time and the work type, the computation processor 13 can detect the abnormality in the apparatus by using the criterion for determination depending on the length of work time and the work type. Moreover, detecting the abnormality means predicting failure of the apparatus. Accordingly, when the time to failure varies depending on the work type, the computation processor 13 can detect the abnormality as a sign of such a failure and improve the accuracy of detection.

Moreover, the abnormality detecting device 1 includes the storage unit 17 that stores the normal models generated from the second frequency characteristic in association with the respective work types and each normal model includes the reference value used to calculate the threshold.

Then, the computation processor 13 obtains the length of work time and the length of pause time corresponding to the work type of the work to be performed by the apparatus (S38) and reads the normal model corresponding to the work type from the storage unit 17 (S39). Next, the computation processor 13 takes out the reference value from the normal model (S40) and calculates the threshold from the reference value, the length of work time, and the length of pause time (S41).

Then, the computation processor 13 calculates the second frequency characteristic from the read normal model and determines whether the comparison target value (data on the vibration) calculated by using the calculated second frequency characteristic is greater than the calculated threshold (S45).

Accordingly, when the length of work time (T, TR) varies depending on the work type, the computation processor 13 can detect an abnormality in the apparatus by using the criterion for determination depending on the length of work time.

Although embodiments of the present invention have been described above, the description and drawings forming part of this disclosure should not be understood to limit the present invention. Various alternative embodiments, modified examples, and operation techniques are apparent from this disclosure to those skilled in the art.

Note that the apparatus that is the target of the abnormality detection is not limited to the work robot 2. For example, an engine of an automobile may be used instead of the motor and a transmission may be used instead of the decelerator. Moreover, the target of abnormality detection may be any of a rotation mechanism of a moving body, a moving body such as play equipment in an amusement park, and a machine tool such as a three-dimensional printer, in other words, any apparatus that includes a rotation mechanism and a mechanism for transmitting the rotation. Moreover, the target may be other types of apparatuses.

Furthermore, the abnormality detecting device 1 may be arranged at a remote location like the computer 5 and exchange necessary signals and data via a communication line to detect an abnormality in the apparatus. Moreover, one abnormality detecting device 1 may detect abnormalities in multiple apparatuses. Furthermore, the multiple apparatuses may be arranged at different locations. Moreover, the functional blocks such as the information obtainer 11, the sensor controller 12, and the computation processor 13 may be formed by using a computer.

The functions described in the aforementioned embodiments can be implemented by one or multiple processing circuits. The processing circuit includes a programed processing device such as a processing device including an electric circuit. The processing device also includes devices such as an application specific integrated circuit (ASIC) and a conventional circuit part arranged to execute the functions described in the embodiments.

REFERENCE SIGNS LIST

1 abnormality detecting device
2 work robot (apparatus)
11 information obtainer
12 sensor controller
13 computation processor (controller)
14 display unit
15 sound output unit
16 communication unit
17 storage unit
21 motor
22 decelerator
23 sensor (vibration sensor)
131 normal model generator
132 frequency characteristic calculator
133 abnormality determiner
134 measurement result outputting unit
140 measurement result
A work
M1 acceleration signal
P, P1, P2, P3, P11, P12, P13 normal model
TH, TH1, TH2, TH3 threshold
a, a1, a2, a3 reference value
T, TR work time length
R pause time length
x correction value

The invention claimed is:

1. An abnormality detecting device comprising a controller that detects an abnormality in an apparatus based on data on vibration detected in the apparatus, wherein the controller
determines an abnormality in the apparatus by comparing the data on the detected vibration with a predetermined threshold, and
sets the threshold such that the shorter a length of work time in which the apparatus performs a certain work is, the smaller the threshold is set.

2. The abnormality detecting device according to claim 1, wherein the controller calculates a first frequency characteristic that is a frequency characteristic of the detected vibration and sets a value according to a difference between the first frequency characteristic and a second frequency characteristic that is a frequency characteristic of the vibration in a normal operation of the apparatus, as the data on the vibration.

3. The abnormality detecting device according to claim 2, wherein the controller sets a value according to a square value of a difference between an average value of values in the first frequency characteristic and an average value of values in the second frequency characteristic, as the data on the vibration.

4. The abnormality detecting device according to claim 3, wherein the controller sets a value according to a value obtained by correcting the square value with a variance value of the second frequency characteristic, as the data on the vibration.

5. The abnormality detecting device according to claim 2, further comprising a storage unit that stores normal models generated from the second frequency characteristic in association with a plurality of work types, respectively, wherein
each of the normal models includes the threshold,
the controller reads the normal model corresponding to the work type of the work to be performed by the apparatus from the storage unit, takes out the threshold from the normal model, calculates the second frequency characteristic from the read normal model, and determines whether the data on the vibration calculated by using the calculated second frequency characteristic is greater than the read threshold.

6. The abnormality detecting device according to claim 2, further comprising a storage unit that stores normal models generated from the second frequency characteristic in association with a plurality of work types, respectively, wherein
each of the normal models includes a reference value used to calculate the threshold,
the controller obtains the length of work time and the length of pause time corresponding to the work type of the work to be performed by the apparatus, reads the normal model corresponding to the work type from the storage unit, takes out the reference value from the normal model, calculates the threshold from the reference value, the length of work time, and the length of pause time, calculates the second frequency characteristic from the read normal model, and determines whether the data on the vibration calculated by using the calculated second frequency characteristic is greater than the calculated threshold.

7. The abnormality detecting device according to claim 1, wherein the controller sets the threshold such that the higher work speed being speed at which the apparatus performs the work is, the smaller the threshold is set.

8. The abnormality detecting device according to claim 1, wherein the apparatus includes a rotation mechanism and the controller calculates the data on the vibration from a signal outputted by a vibration sensor attached to the apparatus.

9. The abnormality detecting device according to claim 1, wherein the shorter a pause time in which the apparatus pauses before the work is, the smaller the threshold is set by the controller.

10. The abnormality detecting device according to claim 1, wherein the controller further obtains a work type of the work, sets the threshold such that the shorter the length of work time is, the smaller the threshold is set and changes the threshold depending on the work type.

11. The abnormality detecting device according to claim 1, wherein the controller
obtains work data including the length of work time,
calculates the data on the vibration from a signal outputted by a vibration sensor attached to the apparatus,
determines whether there is an abnormality in the apparatus based on the threshold calculated by using the length of work time included in the work data and on the calculated data on the vibration.

12. The abnormality detecting device according to claim 1, wherein the controller selects the threshold depending on the length of work time from a plurality of thresholds stored in advance and uses the selected threshold.

13. The abnormality detecting device according to claim 1, wherein, when the data on the vibration is greater than the threshold, the controller gives notice that there is an abnormality in the apparatus.

14. The abnormality detecting device according to claim 1, wherein the apparatus includes a driver having a rotation mechanism and an arm configured to be driven by the driver.

15. An abnormality detecting method of an abnormality detecting device that detects an abnormality in an apparatus based on data on vibration detected in the apparatus, comprising:
determining an abnormality in the apparatus by comparing the data on the detected vibration with a predetermined threshold; and
setting the threshold such that the shorter a length of work time in which the apparatus performs a certain work is, the smaller the threshold is set.

* * * * *